United States Patent [19]

Jensen et al.

[11] Patent Number: 5,258,868
[45] Date of Patent: Nov. 2, 1993

[54] OPTICAL PROCESS VARIABLE TRANSMITTER

[75] Inventors: Stephen C. Jensen, Edina; David M. Socha, Sr., Champlin; Gerald R. Cucci, St. Paul; Brian J. Olson, St. Louis Park, all of Minn.

[73] Assignee: Rosemount Inc., Eden Prairie, Minn.

[21] Appl. No.: 474,444

[22] Filed: Feb. 2, 1990

[51] Int. Cl.⁵ .......................................... H04B 10/00
[52] U.S. Cl. .................................................. 359/168
[58] Field of Search ............... 455/600, 603, 605–607, 455/608, 617; 359/168

[56] References Cited

U.S. PATENT DOCUMENTS

| | | | |
|---|---|---|---|
| 4,345,482 | 8/1982 | Adolfsson et al. | 73/862 |
| 4,346,478 | 8/1982 | Sichling | 455/612 |
| 4,417,140 | 11/1983 | Adolfsson et al. | 250/227 |
| 4,434,665 | 3/1984 | Adolfsson et al. | 73/724 |
| 4,490,606 | 12/1984 | Lockett et al. | 250/227 |
| 4,514,860 | 4/1985 | Adolfsson et al. | 455/612 |
| 4,521,684 | 6/1985 | Gilby et al. | 250/227 |
| 4,651,571 | 3/1987 | McGlade | 73/773 |
| 4,713,540 | 12/1987 | Gilby et al. | 250/231 |
| 4,743,752 | 5/1988 | Olsen et al. | 250/227 |
| 4,764,244 | 8/1988 | Chitty et al. | 156/630 |
| 4,820,916 | 4/1989 | Patriquin | 250/227 |
| 4,856,317 | 8/1989 | Pidorenko et al. | 73/4 |
| 4,857,727 | 8/1989 | Lenz et al. | 250/227 |

FOREIGN PATENT DOCUMENTS

| | | |
|---|---|---|
| 83101817.7 | 10/1983 | European Pat. Off. |
| 8801021 | 3/1988 | France |
| 0105730 | | Japan ................... 455/617 |

OTHER PUBLICATIONS

Article entitled "Sandia Sets Solar Record", *Photonics Spectra*, Oct. 1988.
Article entitled "Telemetry Circuit Powered by Optical Energy" by J. Miskowicz and W. Wojcik (date unknown).
Article entitled "Electro-Optic Architecture (EOA) for Sensors and Actuators in Aircraft Propulsion Systems" by W. L. Glomb, Jr., United Technologies Research Center, Jun. 1989.
Article entitled "Pressure Sensors and Actuators Incorporating Optical Fibre Links" by K. Liu and B. E. Jones. *Sensors and Actuators*, vol. 17, 1989, pp. 501–507.
Article entitled "Multiplexing Elctro-Optic Architectures for Advanced Aircraft Integrated Flight Control Systems", by D. W. Seal, McDonnell Douglas Corporation, Jun. 1989.
Article entitled "Hart Communications", vol. 3, and "Hart Smart Communications Protocol", Rosemount Inc.
Article entitled "Sound Alerter Powered Over an Optical Fiber", by R. C. Miller and S. Kaufman, *The Bell System Technical Journal*, vol. 57 No. 11, Nov. 1978, pp. 3309–3316.
Article entitled "Optically Powered Speech Communication Over a Fiber Lightguide" by R. C. Miller and R. B. Lawry, *The Bell System Technical Journal*, vol. 58, No. 7, Sep. 1979.
Article entitled "Wideband, bidirectional Lightguide Communication with an Optically Powered Audio Channel", by R. C. Miller et al., *The Bell System Technical Journal*, vol. 61, No. 7, Sep. 1982, pp. 1359–1365.
Article entitled "Optically Powered Sensors", by P. Bjork et al., Honeywell Systems and Research Center (date unknown).
Article entitled "Optically Powered Sensors and Network of Associated Sensors", by P. Schweizer.

*Primary Examiner*—Edward L. Coles, Sr.
*Assistant Examiner*—R. Bacares
*Attorney, Agent, or Firm*—Kinney & Lange

[57] ABSTRACT

A light input energizes an optical transmitter providing a light output to a waveguide indicating a process variable. The transmitter has a process variable sensor generating a sensor output. An electrical circuit receives the sensor output and generates an electrical transmitter output indicating the process variable adjusted by a changeable parameter stored in the electrical circuit. The electrical circuit has an input energizing the circuit. An LED converts the electrical transmitter output to the light output. A gallium arsenide photodiode converts a first portion of received light into electrical energy provided to the energization input and converts a second portion of the received light into an electrical output controlling the stored parameter.

15 Claims, 6 Drawing Sheets

OPTICAL PROCESS VARIABLE TRANSMITTER

BACKGROUND OF THE INVENTION

This invention relates to process variable transmitters which are optically energized and provide optical outputs representing the process variable.

The terms light, optic, and radiation as used herein refer to visible and invisible electromagnetic radiation with wavelengths shorter than about 100 microns (100,000 nanometers); the terms electric, electrical used herein refer to lower frequency phenomenon such as commonly occur in electronic circuits operating at frequencies below 100 MHz. The term "process variable" used herein refers to a variable such as pressure, temperature, flow, velocity, specific gravity, etc. sensed by a transmitter such as a process control or aerospace instrument.

SUMMARY OF THE INVENTION

In the present invention, light coupled into a light input of a transmitter energizes electrical circuitry in the transmitter. The light coupled into the light input is modulated with commands which control operation of the transmitter including commands which program one or more reprogrammable transmitter output parameters. The transmitter comprises sensor means which sense a process variable, and the transmitter transmits a programmed optical output indicating the process variable to a medium or waveguide which carries the optical output. The sensor means generate an electrical sensor output representative of the process variable. The electrical sensor output is coupled to circuit means in the transmitter which generate an electrical transmitter output indicating the process variable adjusted or programmed by a changeable or programmable parameter stored in the circuit means. The circuit means comprise an energization input for energizing the circuit means. The transmitter further comprises conversion means for converting the programmed electrical transmitter output to the programmed optical output. The conversion means further includes receiver means for receiving light to convert a first portion of the received light into electrical energy provided to the energization input and for converting a second portion of the received light into an electrical output controlling stored changeable parameters in the circuit means, thus providing programming of the transmitter output.

The transmitter is coupled via a medium or waveguide means to an interface coupled to an electrical data bus. The interface comprises light generating means coupled to the waveguide means and including first means for generating a programming light component modulated to program the transmitter's generation of an optical output by adjusting the stored changeable parameter. The light generating means further comprise second means for generating an energizing light component to energize the transmitter. The interface further comprises control means coupled to the light generating means for electrically controlling the modulation as a function of a first reference received from the bus and for electrically controlling amplitude of the energizing light component as a function of a second reference in the control means. The interface further comprises receiver means for providing an electrical output to the bus representative of a programmed optical output received from the transmitter.

In a preferred multidrop arrangement, the waveguide couples to a plurality of optical process variable transmitters and the light generating means further comprise means for generating a programming light component modulated to program generation of optical outputs by the plurality of addressable transmitters. The programming light component is preferably modulated according to a serial data protocol.

DETAILED DESCRIPTION OF THE PREFERRED EMBODIMENTS

Figure 1:
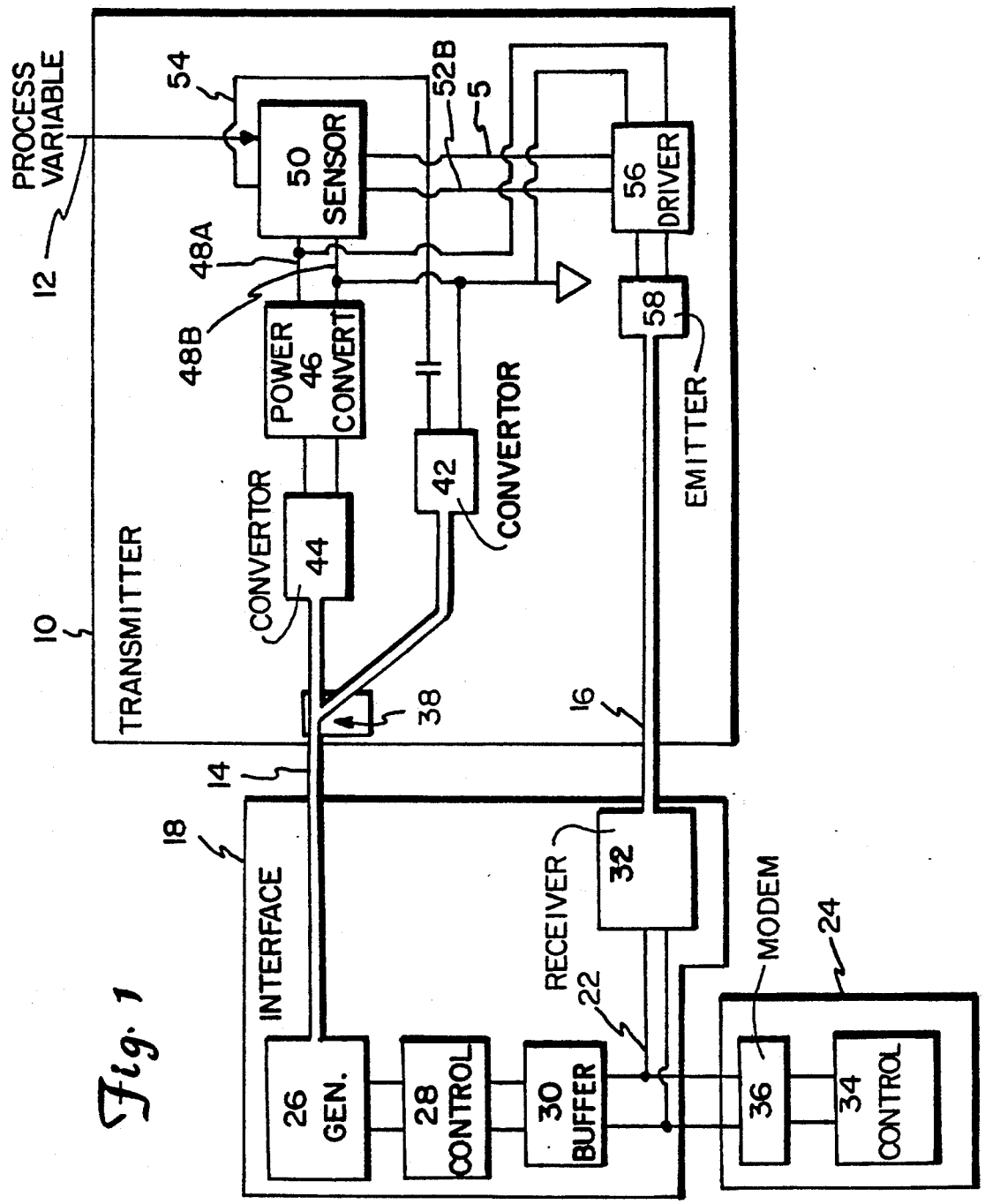
FIG. 1 shows an embodiment of an optical transmitter coupled via waveguides to an interface.

In FIG. 1 optical pressure transmitter 10 senses process variable 12 and communicates via waveguides 14, 16 with interface 18. Interface 18 interfaces the optical signals on waveguides 14, 16 to electrical bus 22 connecting to control system 24 so that two-way communication is established between transmitter 10 and control system 24, with electrically insulating waveguides providing galvanic isolation between the transmitter 10 and bus 22.

Sensed process variable 12 can be pressure, temperature, flow, pH, or the like. Waveguides 14, 16 can be single or multiple strand fiber optic cable and can extend from a short distance up to thousands of meters in length as desired for a particular installation. Transmitter 10 is electrically isolated from control system 24 by waveguides 14, 16 which conduct light but not electric current, thus preventing undesired coupling of electrical energy between control system 24 and transmitter 10.

Light generator 26, which can be a laser, couples light to transmitter 10 via waveguide 14. Light generator 26 generates a first light component which is modulated to program transmitter 10 so that the transmitter's output on waveguide 16 is a programmed output. The modulation of the first light component will normally be a serial data string in a standard serial communication protocol using FSK techniques such as the HART Brand Communication Protocol of Rosemount Inc. or other standard protocol. Programming can comprise storing the settings for span, zero, measurement range, or the like in memory in the transmitter 10 for scaling the transmitter's output. The first light component can also be modulated to interrogate the the transmitter. The transmitter responds to the interrogation with previously stored data such as transmitter location, the transmitter's materials of construction, diagnostic data, compensation and linearization data, and the like.

Light generator 26 generates a second light component which energizes transmitter 10, and this component is normally not modulated. Controller 28 controls the operation of light generator 26. A first reference applied to analog buffer 30 controls modulation of the first light component. A second reference in controller 28 controls amplitude or magnitude of the second light component so that a controlled amount of optical power is provided to waveguide 14. Controller 28 generates a modulated electrical output which is applied to a laser diode in light generator 26 to modulate the light output. Bus 22 provides the first reference to buffer 30, typically comprising serial digital words indicating changes to the programming of transmitter 10, and indicating interrogation commands to be sent to transmitter 10, as well.

Interface 18 receives transmitter 10's light output from waveguide 16 at receiver 32, which can comprise a photodiode detector. Receiver 32 converts the received light output to an electrical signal for transmission to bus 22.

Control system 24 comprises a control 34 which can comprise a computer coupled to bus 22 via modem 36. Control computer 34 provides the reference to the bus which is amplified by analog buffer 30. Control computer 34 receives information contained in the transmitter's light output about the process variable from bus 22 and uses the information to control a process (not shown) or parameter of the process generating the process variable 12.

In transmitter 10, coupler 38 splits light from light generator 26, coupling, in one preferred embodiment, approximately 1% to convertor 42 and coupling the remainder, less losses in the coupler, to convertor 44. Convertors 42, 44 can comprise photodiodes, and preferably comprise gallium arsenide photodiodes to provide preferred high voltage output and high conversion efficiency. Convertor 44 is coupled to a power converter circuit 46 which converts, in one preferred embodiment, the relatively low voltage output (about 0.9 volts) of convertor 44 to a higher voltage output 48A, 48B (3.5 to 5 volts) suitable for energizing MOS circuits. Alternatively, converter 44 can comprise several photodiodes connected in series to provide the higher voltage, making power convertor 46 unnecessary. The output 48A, 48B is applied to sensor circuit 50 for energizing the sensor circuit. Sensor circuit 50 preferably comprises MOS circuitry and a process variable sensor sensing process variable 12. Sensor circuit 50 provides electrical output 52A, 52B indicative of a magnitude of process variable 12. Convertor 42 senses the modulated component of light on waveguide 14 and couples an electrical signal representative of the modulation to circuit 50 via line 54. A driver circuit 56 is energized from lines 48A, 48B and controlled by output on lines 52A, 52B to modulate emitter 58, which can be a light emitting diode. Emitter 58 couples an optical or light output of transmitter 10 along waveguide 16 back to interface 18. The embodiment shown in FIG. 1 enables control system 24 to program transmitter 10 with span, zero, temperature correction data, and the like, and receive a programmed transmitter output back from transmitter 10 without the need for electrical connections or power sources of any kind other than through waveguide 14 to transmitter 10. All of the power for transmitter 10 is provided by the optical waveguide 14.

Figure 2:
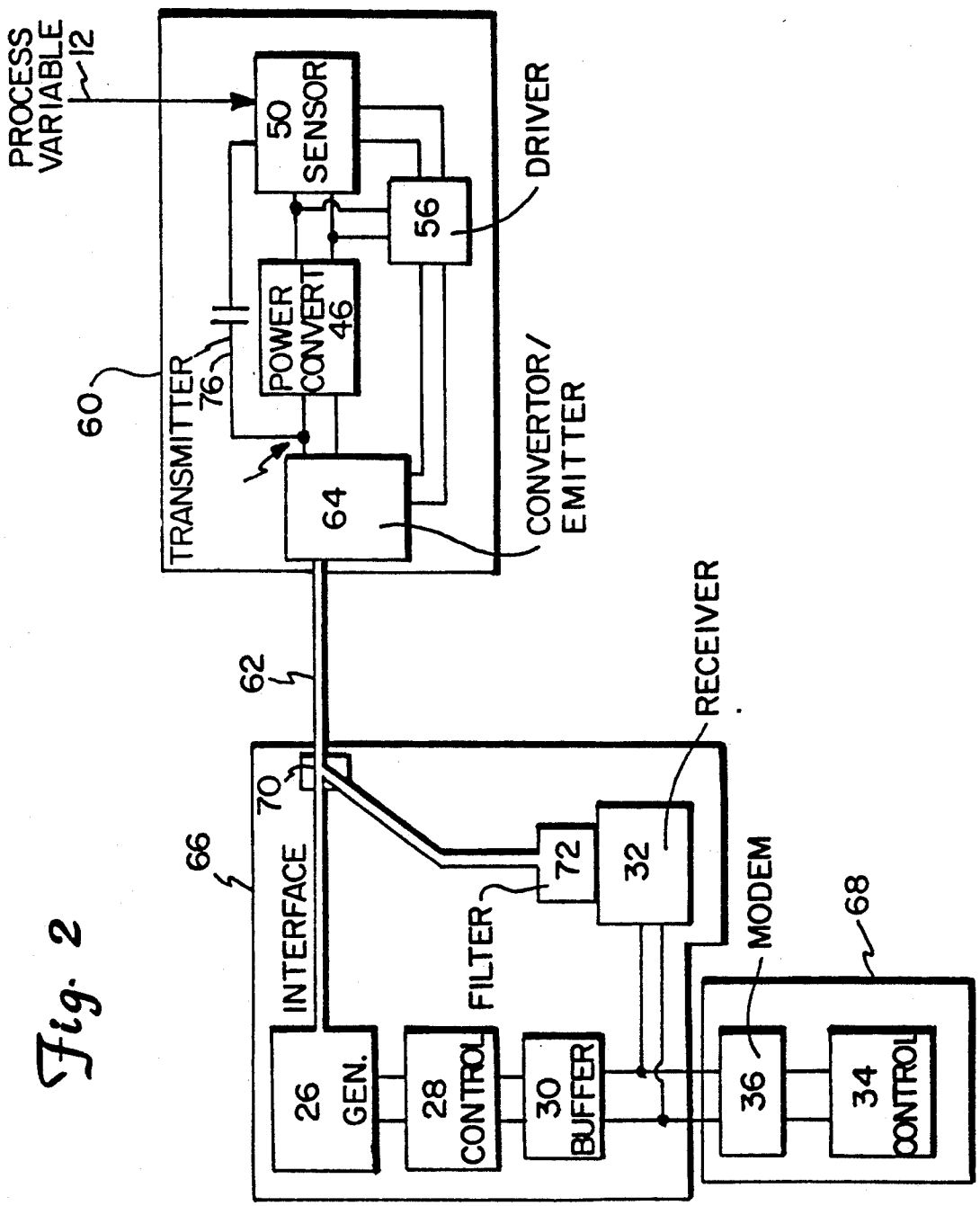
FIG. 2 shows a second embodiment of an optical transmitter coupled via a waveguide to an interface.

In FIG. 2, a further preferred embodiment of an optical communication system is shown. Components with reference numbers corresponding to components previously described perform the same functions. In FIG. 2, a single waveguide 62 couples transmitter 60 to interface 66 which in turn couples to control system 68. Interface 66 includes a coupler 70 which couples light generator 26 and light receiver 32 to waveguide 62.

Light output by light generator 26 preferably is at a wavelength (e.g., 800 nanometer) different from the wavelength (e.g., 660 nanometer) of light output from transmitter 60. In this case, coupler 70 is preferably a dichroic mirror which enhances the optical throughput of the system and optical filter 72 can be used to filter out residual light originating from the light generator 26.

In FIG. 2, a device 64 couples to single waveguide 62 to receive light from light generator 26 and also transmits the transmitter light output to interface 66 through waveguide 62. Device 64 comprises a gallium arsenide photodiode which provides an electrical output on line 74 coupling to power converter 46. The output on line 74 is also capacitively coupled along line 76 to provide the modulated component of received light to the sensor circuit 50. Device 64 further comprises a light emitting diode driven by driver 56. The embodiment in FIG. 2 provides communication and energization as in FIG. 1, however, in FIG. 2 this is achieved with a single waveguide between transmitter 60 and interface 66. Various combinations of uses of couplers and extracting modulation shown in FIGS. 1 and 2 can be used to achieve the same resulting energization and communication. In FIGS. 1 and 2, the light generator 26 provides all of the energization for the transmitter, and there is no need for separate sources of power such as wires, batteries, or solar cells. Electrical circuitry in the transmitter and light modulation in the transmitter is solely powered by light received from a waveguide.

Figure 3:
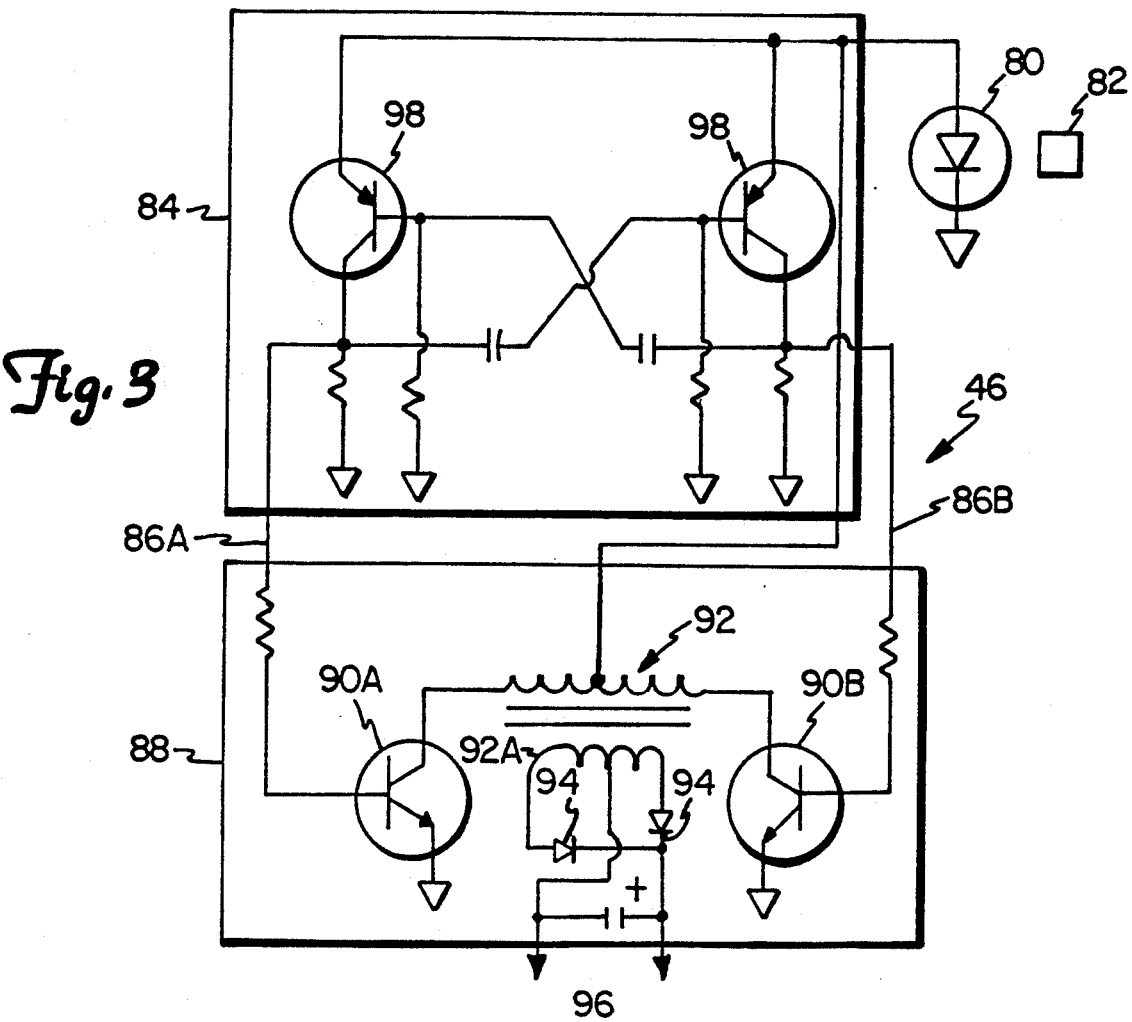
FIG. 3 shows an embodiment of a DC to DC converter circuit used in an optical transmitter.

In FIG. 3, a circuit diagram of power converter 46 is illustrated coupled to a gallium arsenide photodiode 80 receiving light for energization from waveguide 82. Photodiode 80, in turn, energizes a free running multivibrator circuit 84. The multivibrator circuit 84 generates a pair of oscillatory outputs 86A, 86B which are electrically out of phase with one another. Photodiode 80 also energizes a step up transformer type power supply 88. The outputs 86A, 86B are coupled to transistors 90A, 90B respectively driving a primary winding of transformer 92. A secondary winding 92A of transformer 92 is coupled to full wave rectifier 94 to provide a voltage output 96 (3.5 to 5 volts) higher than the voltage used to energize the converter 46, typically 0.9 volts from gallium arsenide photodiode 80. Transistors 90A, 90B, 98 can be germanium type transistors to achieve operation at even lower voltages.

Figure 4:
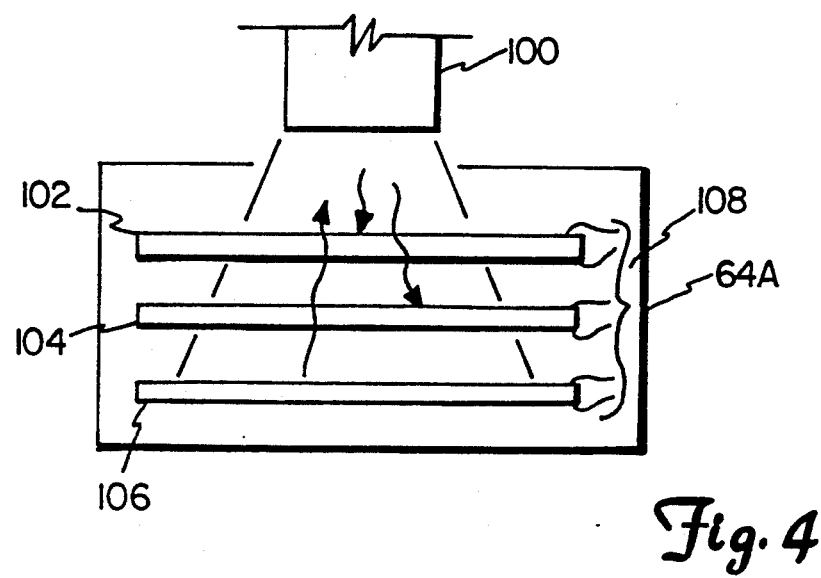
FIG. 4 shows an embodiment of an optical transceiver coupled to a waveguide.

In FIG. 4, a solid state or semiconductor device 64A is shown providing the function of device 64 of FIG. 2 or the function of convertors 42, 44 and coupler 38 in FIG. 1. In FIG. 4, a light emitting diode 106 generates a light output at a first wavelength. Layers 102, 104 are formed of materials which are substantially transparent at the first wavelength. Light output from light emitting diode 106 couples through layers 102, 104 to waveguide 100 forming the light output from the transmitter. Layer 104 comprises a photodiode sensor for sensing modulation and corresponds to convertor 42 in FIG. 1. Layer 102 comprises a sensor for providing electrical energization and corresponds to convertor 44 in FIG. 1. The light for energization is at a second wavelength different than the first wavelength, and the light for modulation is at a third wavelength different from the first and second wavelengths. The sensors in layers 102, 104 are correspondingly wavelength selective so that separate modulation and power outputs are generated on leads 108. Alternatively, energization and modulation can be at the same wavelength, diode 104 can be eliminated and modulation and power can both be detected by a single photodiode on layer 102.

Figure 5:
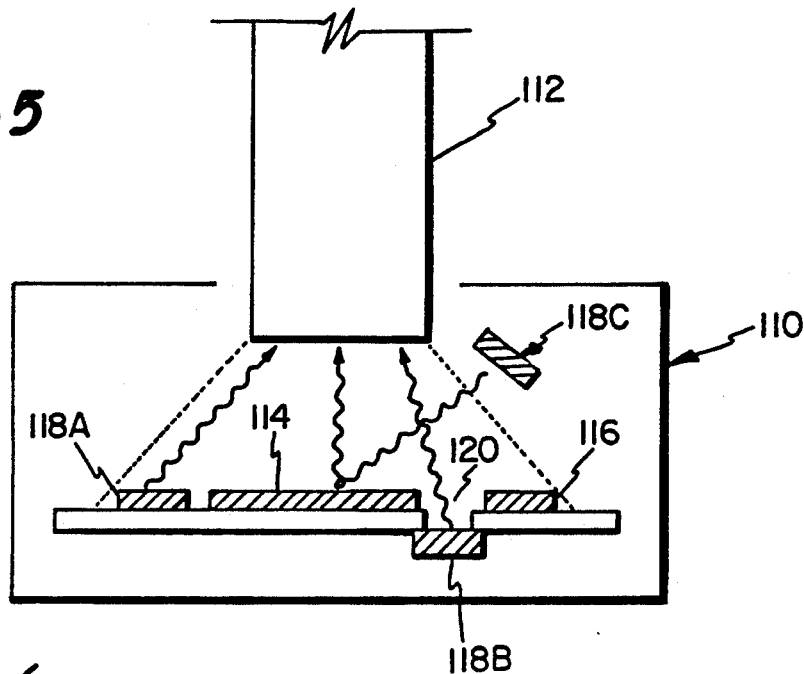
FIG. 5 shows a second embodiment of a optical transceiver coupled to a waveguide.

In FIG. 5, another device 110 for use in transceiving light in a transmitter is shown which receives and transmits light to a waveguide 112. Gallium arsenide photodiode 114 receives light for energizing the transmitter and converts it to electrical energy. Photodiode 116 receives light and provides the modulation signal. As explained above, photodiode 116 can be left out when the modulation signal is taken from photodiode 114 as in FIG. 2. The light output of the transmitter can be generated by a light emitting diode 118 disposed at location 118A, 118B, or 118C. For location 118B, a port 120 through the photodiode 114 allows light from the light emitting diode at 118B to reach the waveguide 112. For location 118C, the light from LED 118 is reflected from the photodiode 114 into the waveguide 112. The shapes of the photodiode surfaces 114, 116, 118A and their arrangement can be any arrangement convenient for coupling light to and from waveguide 112. Preferably, the active elements substantially fill the light capture angle (numerical aperture) of the waveguide to reduce losses. Active areas can be concentric rings, sectors of a circle or an arbitrary shape.

Figure 6:
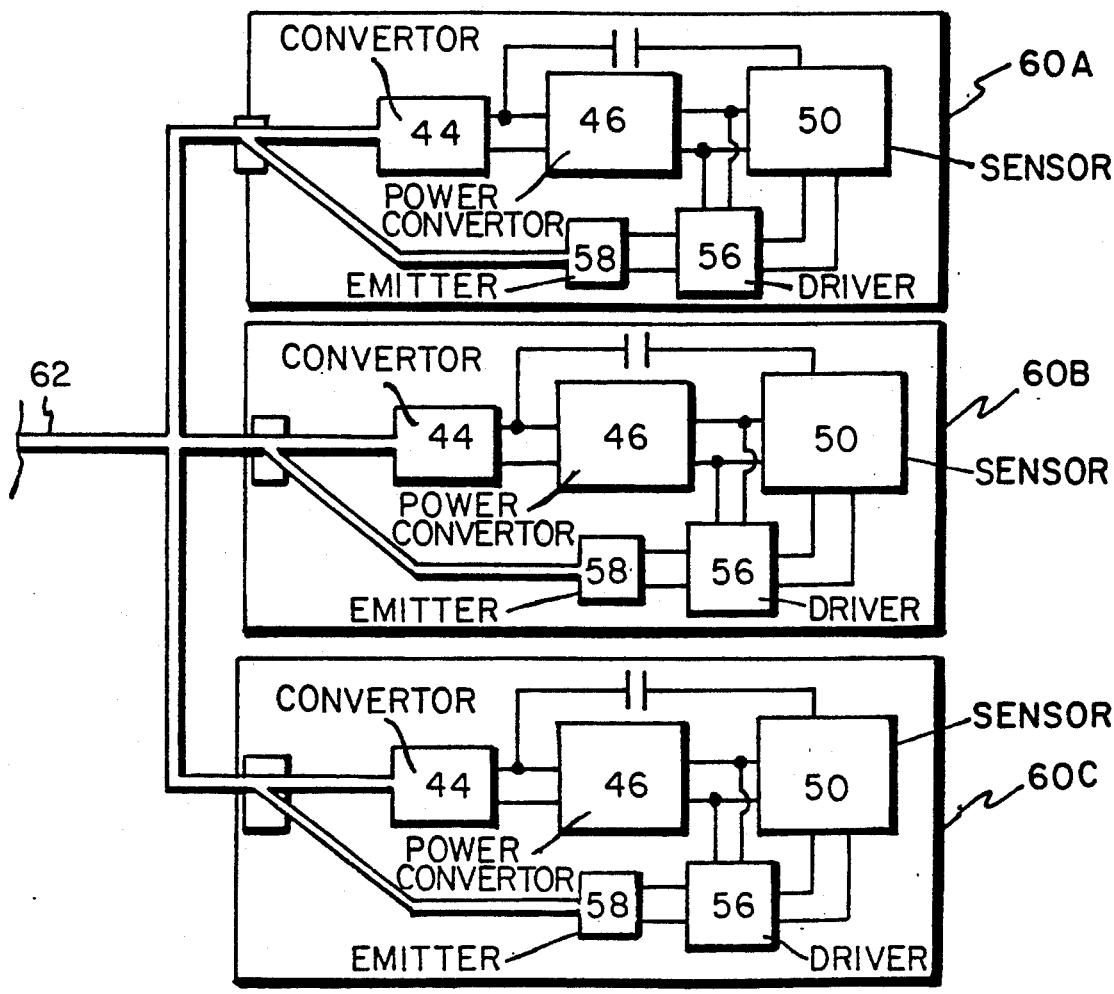
FIGS. 6, 7 and 8 show three embodiments of multidrop optical transmitters coupled to a waveguide.
Figure 7:
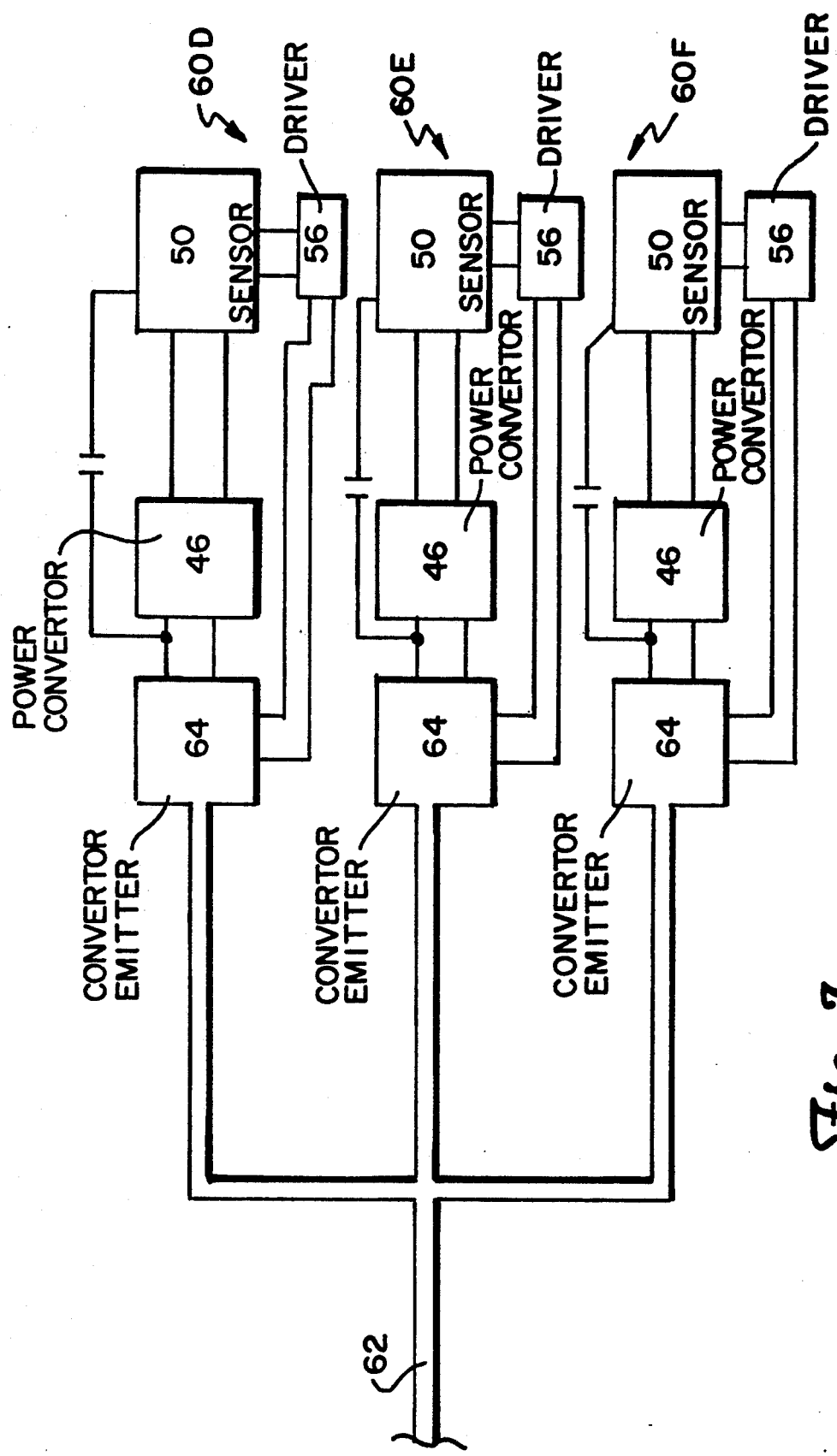

In FIG. 6, a "multidrop" arrangement of transmitter 60A, 60B, 60C coupling to a single waveguide 62 is shown. Interface 66 (shown in FIG. 2) couples enough light to the waveguide 62 to provide all of the energization for multiple transmitters. The light outputs of each of the transmitters is formed as a digital word which includes an address identifying the transmitter to the interface 66. Likewise, the modulated output from light converter 26 (shown in FIG. 2) comprises digital words which include an address identifying the transmitter which is to receive and respond to the digital word. In FIG. 7, a further alternative embodiment of a multidrop arrangement of a plurality of transmitters 60D, 60E, 60F coupling along a single waveguide 62 to an interface 66 (shown in FIG. 2). The light outputs from each transmitter can comprise serial digital data in a selected multidrop digital protocol such as the HART digital protocol of Rosemount Inc.

Figure 8:
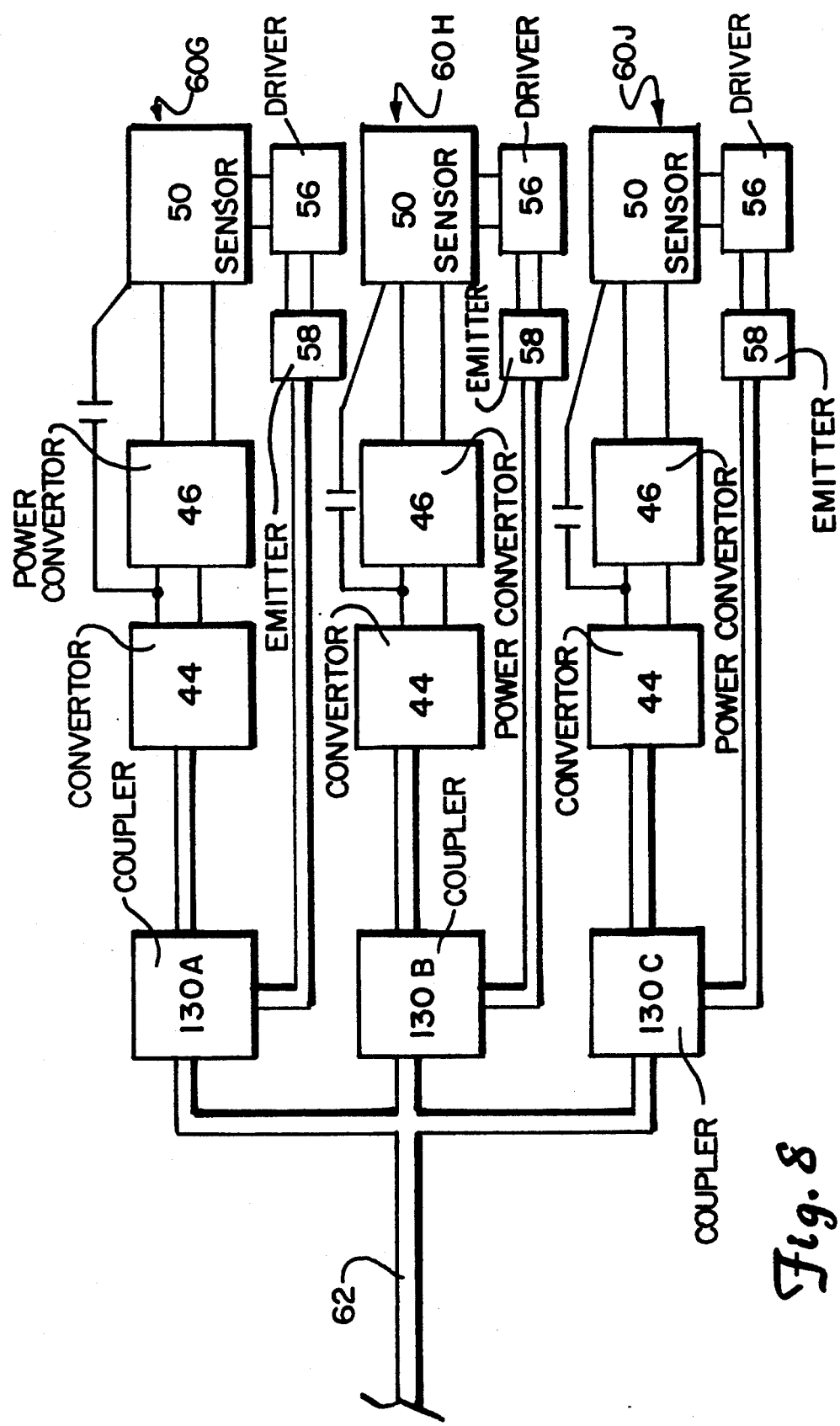

In FIG. 8, a further embodiment of a multidrop arrangement of transmitters 60G, 60H, 60J coupling via waveguide 62 to interface 66 (shown in FIG. 2) is shown. In FIG. 8, wavelength division couplers 130A, 130B, 130C in each transmitter provide optically separated coupling paths for the excitation and modulation at one wavelength and the transmitter light output at a second wavelength different than the first. Many known wavelength coding and decoding arrangements can be used, and many known electrical communication protocols, including half duplex and full duplex arrangements can be adapted for use in optical communication over the optical media.

Although the present invention has been described with reference to preferred embodiments, workers skilled in the art will recognize that changes may be made in form and detail without departing from the spirit and scope of the invention.

What is claimed is:

1. A transmitter having a light input energizing the transmitter and providing a light output to an optical medium indicating a process variable, comprising:
    sensor means for generating an electrical sensor output representative of the process variable;
    circuit means receiving the sensor output for generating an electrical transmitter output indicating the process variable adjusted by a changeable parameter stored in the circuit means, the circuit means having an energization input for energizing the circuit means;
    conversion means for converting the transmitter output to the light output, the conversion means including: receiver means having a receiving surface receiving light from a waveguide coupled to a light generator for converting a first portion of the received light into electrical energy provided to the energization input and for converting a second portion of the received light into an electrical output controlling the parameter, and an emitter surface emitting light to the waveguide;
    wherein the waveguide receives and transmits light within a light capture angle; and
    wherein the emitting surface and the receiving surface substantially fill the light capture angle with the receiving surface disposed along a light path between the waveguide and the emitting surface, the receiving surface being arranged to permit light to pass along the path from the emitting surface to the waveguide.

2. The transmitter of claim 1 wherein the receiving surface has a port therethrough for passing the light from the emitting surface.

3. The transmitter of claim 1 wherein the receiving surface is at least partially transparent to pass light from the emitting surface.

4. The transmitter of claim 1 wherein the receiving surface reflects light from the emitting surface to the waveguide.

5. A transmitter having a light input energizing the transmitter and providing a light output to an optical medium indicating a process variable, comprising:
    sensor means for generating an electrical sensor output representative of the process variable;
    circuit means receiving the sensor output for generating an electrical transmitter output indicating the process variable adjusted by a changeable parameter stored in the circuit means, the circuit means having an energization input for energizing the circuit means; and
    conversion means for converting the transmitter output to the light output, the conversion means further including receiver means receiving light from a light generator for converting a first portion of the received light into electrical energy provided to the energization input and for converting a second portion of the received light into an electrical output controlling the parameter, wherein the received light represents a linearity correction of the transmitter output, and wherein the parameter stored in the circuit means is a function of the linearity correction programmed by the received light.

6. A transmitter having a light input energizing the transmitter and providing a light output to an optical medium indicating a process variable, comprising:
    sensor means for generating an electrical sensor output representative of the process variable;
    circuit means receiving the sensor output for generating an electrical transmitter output indicating the process variable adjusted by a changeable parameter stored in the circuit means, the circuit means having an energization input for energizing the circuit means; and conversion means for converting the transmitter output to the light output, the conversion means further including receiver means receiving light from a light generator for converting a first portion of the received light into electrical energy provided to the energization input and for converting a second portion of the received light into an electrical output controlling the parameter, wherein the received light represents a temperature correction of the transmitter output, and wherein the parameter stored in the circuit means is a function of the temperature correction programmed by the received light.

7. An interface between an optical medium communicating with a remote optical process variable transmitter and an electrical bus, comprising:

light generating means coupled to a waveguide and including first means for generating a programming light component modulated to program a changeable parameter stored in the transmitter to scale an optical output of the transmitter, and second means for generating an energizing light component energizing the transmitter;

control means coupled to the light generating means for electrically controlling the modulation as a function of a first reference received from the bus and for electrically controlling amplitude of the energizing light component as a function of a second reference in the control means; and receiver means for providing an electrical output to the bus representative of the optical output received from the transmitter.

8. The interface of claim 7 wherein the waveguide couples to a plurality of optical process variable transmitters and the first means further comprises means for generating a programming light component modulated to program generation of optical outputs by the plurality of transmitters.

9. The interface of claim 8 wherein the energizing light component energizes the plurality of optical process control transmitters.

10. The interface of claim 9 wherein the programmed optical output is coupled along the waveguide.

11. The interface of claim 10 wherein the receiver converts the programmed optical outputs from a plurality of optical process transmitters to a common electrical bus.

12. A transmitter having a light input energizing the transmitter and providing a light output to an optical medium indicating a process variable, comprising:

sensor means for generating an electrical sensor output representative of the process variable;

circuit means receiving the sensor output for generating an electrical transmitter output indicating the process variable adjusted by a changeable parameter stored in the circuit means, the circuit means having an energization input for energizing the circuit means; and conversion means for converting the transmitter output to the light output, the conversion means further including receiver means receiving light from a waveguide coupled to a light generator for converting a first portion of the received light into electrical energy provided to the energization input and for converting a second portion of the received light into an electrical output controlling the parameter, wherein the receiver means comprises:

light receiving means disposed adjacent the waveguide for receiving the first portion of the received light and converting the first portion of the received light into a first signal having a first voltage level, a first circuit electrically connected to the light receiving means and receiving the first signal, the first circuit providing an oscillatory output signal, and a second circuit electrically connected to the first circuit and receiving the oscillatory output signal to provide the electrical energy at a second voltage level that is greater than the first voltage level.

13. The apparatus of claim 12 wherein the first circuit further provides a second oscillatory output signal that is electrically out of phase with the oscillatory output signal, and wherein the second circuit further receives the second oscillatory output signal.

14. The apparatus of claim 13 wherein the first circuit comprises a multivibrator circuit.

15. The apparatus of claim 13 wherein the second circuit comprises a transformer having a primary winding coupled to the light receiving means and receiving the first signal and a secondary winding coupled to a full wave rectifier, the electrical energy being provided form the full wave rectifier.

* * * * *